Feb. 17, 1953  J. E. TOMPKINS  2,628,643
WOOD SAWING MACHINE

Filed July 31, 1948  4 Sheets-Sheet 1

INVENTOR.
J. EVERETTE TOMPKINS
BY
Harry P. Canfield
ATTORNEY.

Feb. 17, 1953   J. E. TOMPKINS   2,628,643
WOOD SAWING MACHINE
Filed July 31, 1948   4 Sheets-Sheet 2

INVENTOR.
J. EVERETTE TOMPKINS
BY
Harry P. Canfield
ATTORNEY.

Feb. 17, 1953   J. E. TOMPKINS   2,628,643
WOOD SAWING MACHINE
Filed July 31, 1948   4 Sheets-Sheet 3

INVENTOR.
J. EVERETTE TOMPKINS
BY Harry P. Canfield
ATTORNEY

Feb. 17, 1953    J. E. TOMPKINS    2,628,643
WOOD SAWING MACHINE

Filed July 31, 1948    4 Sheets-Sheet 4

INVENTOR
J. EVERETTE TOMPKINS
BY *Strauch, Nolan & Diggins*
ATTORNEYS

Patented Feb. 17, 1953

2,628,643

UNITED STATES PATENT OFFICE 2,628,643

WOOD SAWING MACHINE

John Everette Tompkins, Cleveland, Ohio, assignor of 30/100 to Ralph R. Roemer and 35/100 to Louise E. Roemer, both of Cleveland, and 25/100 to William R. Kiefer, Gate Mills, and 10/100 to said J. Everette Tompkins, Cleveland, Ohio Application July 31, 1948, Serial No. 41,835

11 Claims. (Cl. 143—6)

This invention relates to power operated machine tools of the wood-sawing class; and relates more particularly to motor driven wood sawing machines of the general type illustrated and described in the co-pending patent application of Carl F. Duerr, Jr., Serial Number 641,980, filed January 18, 1946, now Patent No. 2,590,093, issued March 25, 1952.

Machines of this type comprise generally a work table, an arm supported above the table, a horizontal trackway supported by the arm, a carriage reciprocable on the trackway, and a motor driven circular saw suspended from the carriage, and reciprocable therewith.

The support on the arm for the horizontal trackway is in the form of a pivot bearing construction having a vertical pivot bearing axis intermediate of the ends of the trackway, upon which the trackway may be pivotally adjusted to different angular positions and locked in each position; and the bearing construction as a whole may be adjustably shifted horizontally along the arm to different positions and locked in each position; and the carriage may be locked in different positions along the trackway.

By these means, the saw above the table may be adjustably positioned with respect to the work supported on the table, and positioned and stabilized thereon by engagement with a fence in a well known manner; and the saw may then be operated to make cross-cuts, miter cuts of different angles, and rip cuts of different widths, in a manner now known in this art, and as described in the aforesaid co-pending application.

In such machines also the saw is direct-connected to the motor; and the suspension of the motor from the reciprocable carriage as mentioned comprises a trunnion bearing construction having a horizontal bearing axis upon which the motor-and-saw unit may be adjustably rocked to different angular positions and locked in each position, by which means the saw may be set to make bevel cuts at different angles, in a well known manner.

Machines of this type are applied to various classes of work in the different arts and this has led to the development of different sizes of machine, predicated upon the diameter of the saw and the motor horsepower to drive it.

There is now a market demand for a machine of smaller size and at a lower price than has heretofore been possible, for use in industrial production of small parts, and in home workshops. The problem has thus arisen of providing a construction that will be smaller and cheaper to manufacture, and in some respects simpler than, but without sacrificing any of the advantages and mode of operation of, the present larger sizes.

It is thus the primary object of the present invention to provide the solution to this problem.

It has been found that a considerable saving in cost can be made in the aforesaid pivot bearing construction and in the aforesaid trunnion bearing construction, when improved to adapt them particularly to a machine or small size; and accordingly, it is a further object of the present invention to provide such improved bearing constructions.

Other objects will be apparent to those skilled in the art to which the invention appertains.

The invention is fully disclosed in the following description taken in connection with the accompanying drawing, in which.

Figure 1:
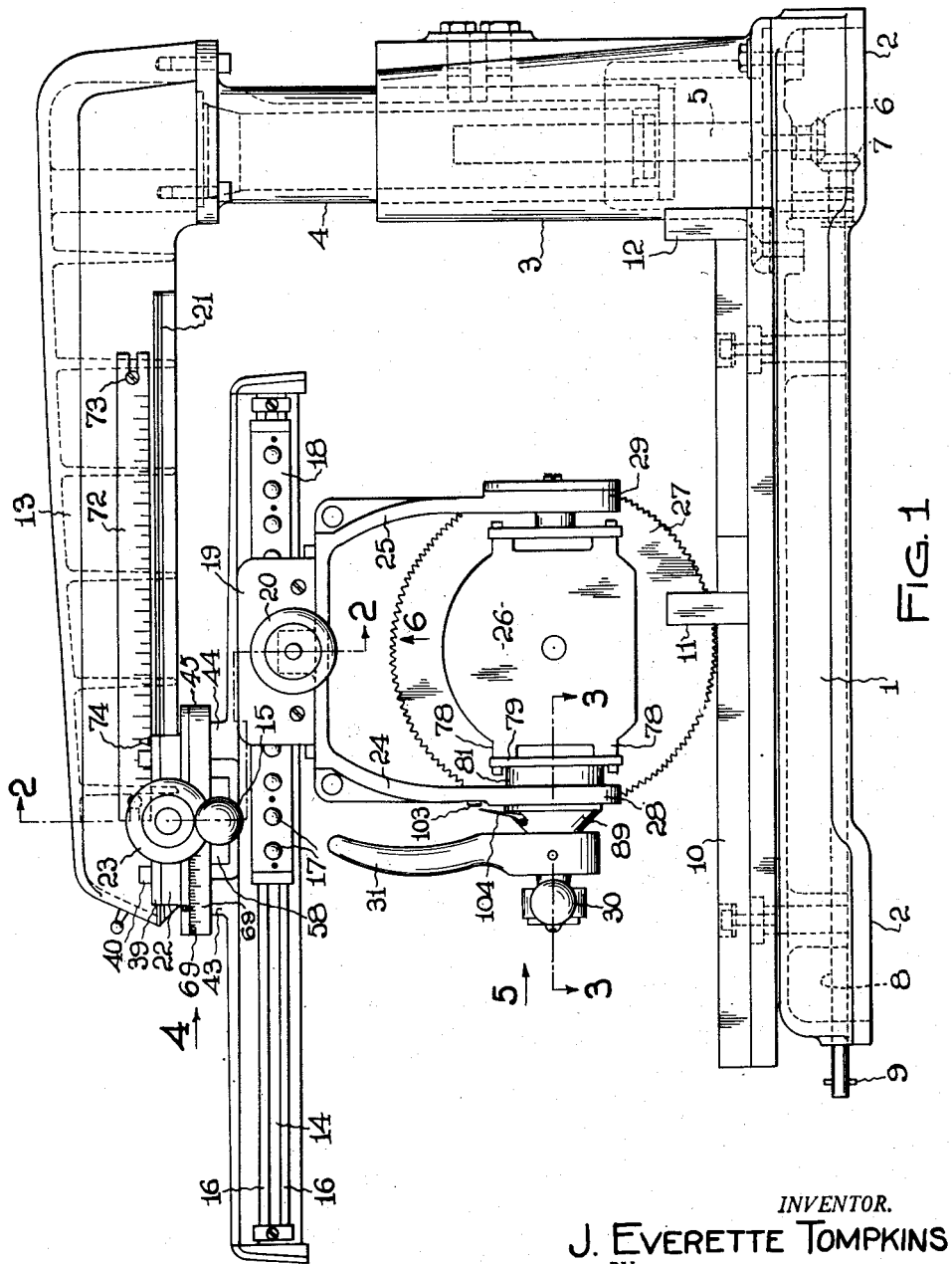
Fig. 1 is a side elevational view of a sawing machine embodying my invention.

As will be apparent from an inspection of Fig. 1 of the drawing, the sawing machine chosen to illustrate the invention hereof is a bench type machine, having a downwardly open pan-like cast metal base 1 provided with planar feet 2—2 for resting upon a work bench or like support.

Rising from the rear of the base is a hollow column 3 having a stem 4 fitted therein for vertical adjusting movement.

Mechanism housed in the base 1 and column 3 is provided to raise and lower the stem 4 comprising an elevating screw 5, gears 6—7, a rotary shaft 8, and a handle engageable clutch 9 for rotating the shaft 8, these parts not constituting any essential part of the present invention being shown only in dotted lines. For a more complete understanding of their construction and mode of operation, reference may be had to the aforesaid pending application in which a similar mechanism is described in detail.

A horizontal work table 10 of wood is mounted on the base 1 upon which work may be laid, and is provided with a forward fence 11 and rearward fence 12 to position and stabilize the work.

At the top of the stem 4 is a horizontal cast metal arm 13 overhanging the work table 10.

Beneath the arm 13 is a horizontal trackway 14 supported by the arm on a pivot bearing construction, to be more fully described, the pivot bearing having a vertical pivot axis intermediate of the ends of the trackway on which the trackway may be swung in horizontal planes to different angular positions. The construction comprises locking means operable by a handle 15 for locking the trackway in any swung position.

The trackway 14 has pairs of horizontal rails 16—16 on opposite sides thereof and bearing balls 17 in a cage 18, for each pair of rails, constitute part of an anti-friction bearing upon which a carriage 19 may be reciprocated therealong substantially without friction.

The carriage 19 may be locked in any position along the trackway 14 by turning a handle 20.

The arm 13 has a pair of horizontal guideways 21 on its opposite sides and the pivot bearing construction comprises a head 22 reciprocable therealong to shift the position of the said vertical pivot axis; and it may be locked to the arm in any position therealong by turning a handle 23.

A pair of hangers 24 and 25 depend from the carriage 19 and a motor, in a housing 26 drivingly connected to a circular saw 27, is suspended on the hangers 24—25 on trunnion bearings, generally at 28—29, having a common horizontal bearing axis, upon which the motor housing may be rocked to different angular positions; and it may be locked in any position at the trunnion bearing 28 by a handle 30. A handle 31 is provided which may be used to rock the motor, but is primarily for propelling or reciprocating the motor-saw unit 26—27 suspended from the reciprocable carriage 19.

Figure 2:
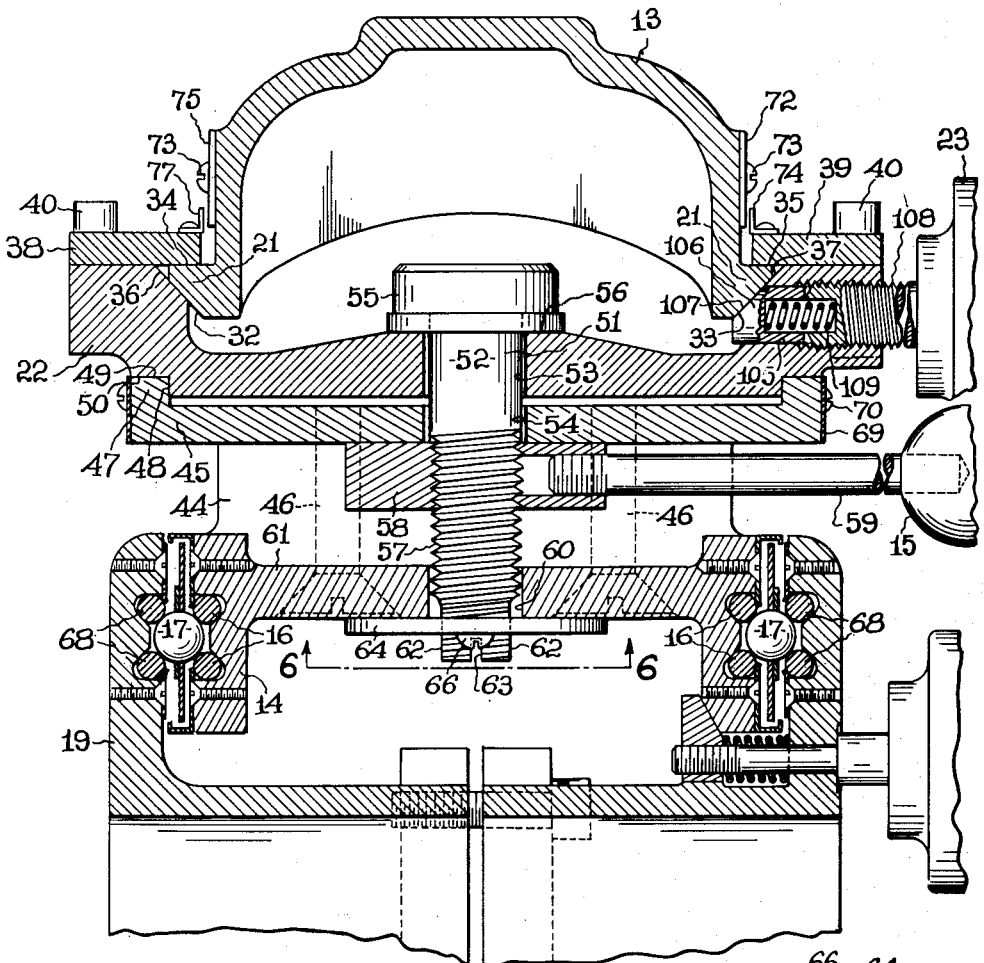
Fig. 2 is a sectional view taken from the staggered plane 2—2 of Fig. 1, and drawn to larger scale.
Figure 5:
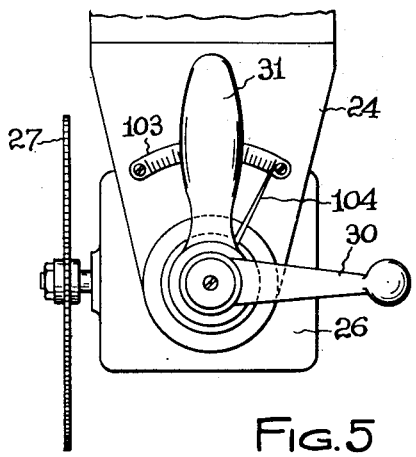
Fig. 5 (Sheet 2) is a fragmentary elevational view taken in the direction of the arrow 5 of Fig. 1.
Figure 6:
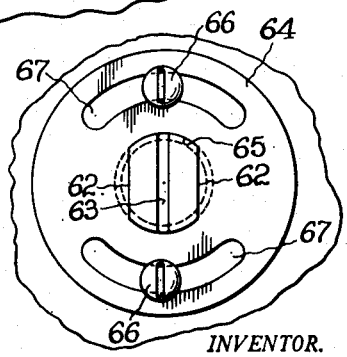
Fig. 6 is a fragmentary view taken from the plane 6—6 of Fig. 2.
Figure 3:
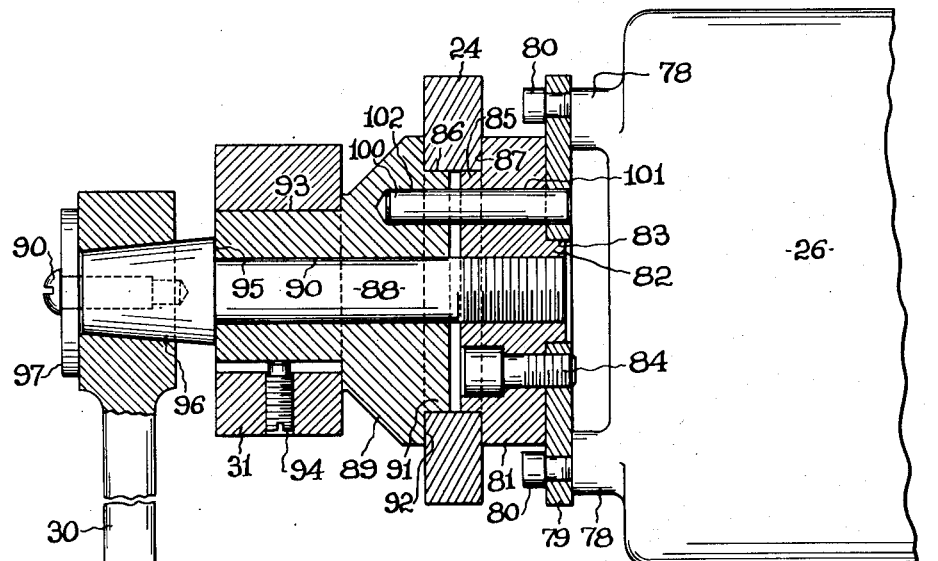
Fig. 3 is a sectional view taken from the plane 3—3 of Fig. 1, and drawn to larger scale.
Figure 4:
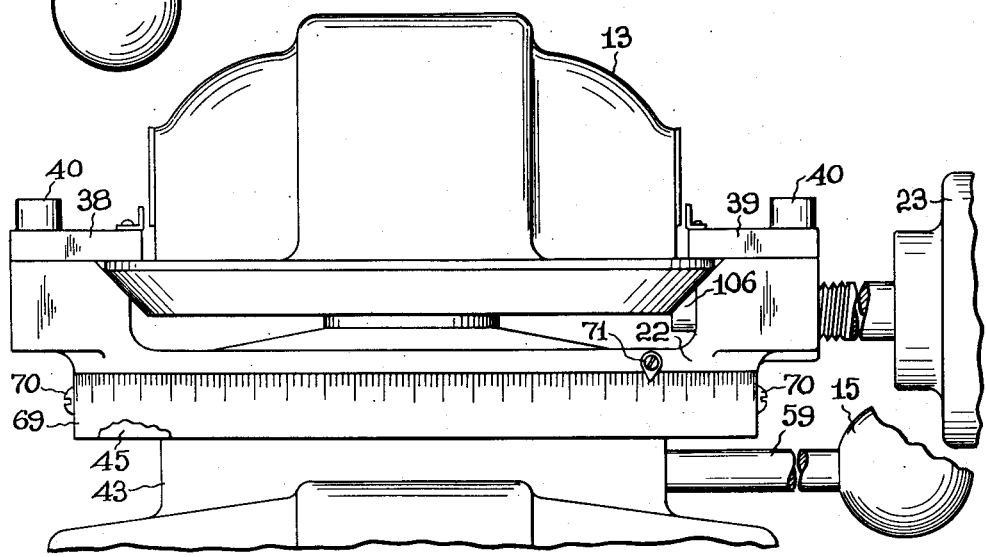
Fig. 4 is a fragmentary elevational view taken in the direction of the arrow 4 of Fig. 1 and drawn to larger scale.

Reference may now be had to Figs. 2, 4, and 6 for a more complete showing of the parts of the pivot bearing construction; and to Figs. 3 and 5 for a more detailed showing of the parts of the trunnion bearing construction; embodying the invention.

As shown in Fig. 2, the guideways 21—21 on the arm 13 have downwardly inwardly inclined planar faces 32—33 respectively and upper horizontal planar faces 34—35.

The said head 22 has faces 36—37 coinciding with the inclined guideway faces 32—33; and plates 38—39 secured to the head by screws 40—40 engage the horizontal guideway faces 34—35.

The head 22 is thereby mounted for sliding movement on the guideways 21—21 of the arm 13 to adjust its position therealong as referred to.

At one side of the head 22 it has a cylindrical bore 105 extending therethrough, opening at the inclined surface 37 thereof. A cylindrical gib 106 is reciprocably fitted in the inner end of the bore 105 and has an inclined face 107 abutting upon the face 33 of the adjacent guideway 21. A stem 108 is threaded into the outer end of the bore 105 and on its outer end has the aforesaid handle 23 thereon for turning it; and at its inner end it abuts upon the gib 106 whereby it may forcibly engage the gib with the surface 33 to thereby lock the head 22 upon the guideway 21. If wanted, a spring 109 may be seated in confronting recesses respectively in the gib 106 and stem 108 to maintain, at all times, a slight inward thrust on the gib 106 to keep it in contact with the guideway face 33 and thereby prevent it from rotating in the bore 105.

The trackway 14 has a pair of transverse posts 43—44 (see also Fig. 1) rising therefrom; and a disc or disc-like element 45 is mounted upon the tops of the posts by screws 46—46, two to each post, projected from below upwardly through the trackway 14 and through the posts 44 and threaded into the disc 45.

The disc 45 has an annular peripheral rim 47, radially inwardly fitting with a sliding fit, an annular or cylindrical shoulder 48 on the head 22; and the rim has a planar horizontal annular face 49 coinciding with a like face 50 on the head 22.

Coaxial with the cylindrical shoulder 48 is a vertical pivot pin 51, having a cylindrical body 52, in bores 53 and 54 in the head 22 and disc 45 respectively. A head 55 on the pin 51 engages at its underside a planar surface 56 on the upper side of the head 22.

Below the disc 45 the pivot pin 51 is threaded as at 57; and passes through a threaded nut 58, lying between the trackway posts 43—44.

As will be apparent the disc 45 and the trackway 14 fastened to it will rest by gravity on the nut 58 and be supported on the head 22 by the pin head 55. Upon turning the nut 58, in one direction (assuming that the pin 51 is held against rotation) the disc 45 and head 22 will be drawn together between the nut 58 and pin head 55, the faces 49 and 50 of the disc 45 and head 22 being thereby clamped and locked upon each other with great friction.

Upon rotating the nut 58 in the reverse direction the locking engagement will be relieved and the disc 45 and trackway 14 fastened to it may be rotated about the vertical axis of the cylindrical surface 48 on the head.

Figure 7:
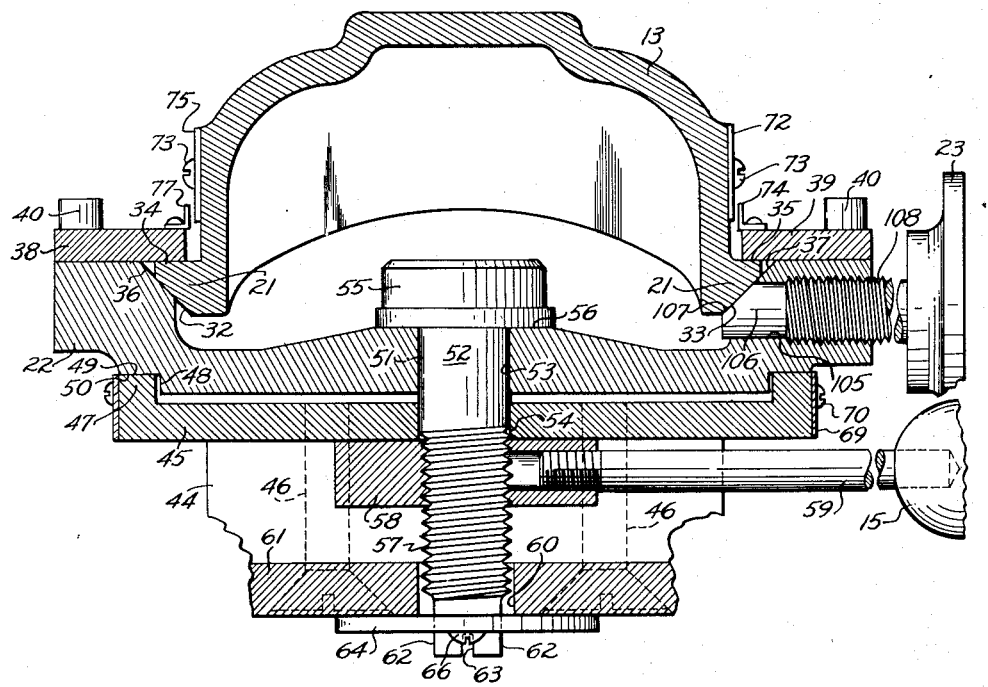
Fig. 7 is a fragmentary view similar to Fig. 2 illustrating an alternative embodiment of applicant's trackway pivot.

The rim 47 of the disc 45 may fit with the cylindrical shoulder surface 48 of the head and clearance may be provided at the pin 51 and its bore 53 so that the rotary pivot bearing will be between the disc and the head as referred to (Fig. 2); but if preferred, the body 52 of the pin 51 may fit its bore 53 and clearance may be provided at the head surface 48 (Fig. 7) so that upon rotating the trackway, its pivot bearing will be on the pin 51. In either case, a clearance may be provided at bore 54.

The handle 15 for turning the nut 58 is mounted on the outer end of a rod-like stem 59 which extends inwardly between the posts 43—44 and is screwed into the side of the nut.

Provision is made to keep the pivot pin 51 from turning and to adjust the nut 58 so that the handle 15 will always be able to draw the nut tight in the limited angle of movement of the stem 59 between the posts 43—44. The pin 51 extends downwardly below the nut 58 through a bore 60 in a transverse wall 61 of the trackway; and its lower end portion has flats 62—62 on its opposite sides (see also Fig. 6). A screw driver slot 63 is provided in its lower end. A washer 64 having a central hole 65 conforming peripherally to the shape of the said lower end portion of the pin, is telescoped thereover; and is secured to the underside of the transverse wall 61 by screws 66—66 projected upwardly through concentric arcuate slots 67—67 in the washer, and screwed into the transverse wall 61.

Normally the aforesaid flats 62—62 of the pin 51 interlock with the periphery 65 of the hole in the washer 64 and prevent the pivot pin from rotating.

To adjust the nut 58 along the threads of the pivot pin 51 for the described purposes, the screws 66—66 are loosened, the pivot pin and washer 64 are rotated in unison by a screw-driver in the slot 63 to propel the nut 58 upwardly or downwardly, and the screws 66 again tightened in the new rotated position of the washer 64.

As to the trackway parts shown in Fig. 2, the said pairs of rails or raceways 16—16 on the trackway 14 have confronting them, pairs of short raceways 68—68 on the carriage 19, and the said balls 17—17 are engaged between the long and short raceways at each side of the trackway, and the carriage 19 thus hangs upon and is supported by the ball bearings thus provided. A more complete description of a ball bearing trackway of this construction may be found in the said co-pending application.

The rotated positions of the trackway are indicated by a scale 69 mounted by screws 70 on the periphery of the disc 45; and by a pointer 71 mounted on the head 22 cooperating therewith, see Fig. 4.

A scale 72 (Figs. 1 and 2) mounted by screws 73 on one side of the arm 13 and a scale pointer 74 therefor mounted on the head 22 indicate the position of the saw 27 relative to one of the fences, say the fence 11; and a similar scale 75 secured to the other side of the arm 13 by screws 73, and a scale pointer 77 on the head 22, indicate the position of the saw relative to the other fence 12.

Coming now to the construction of the trunnion bearing 28, as best shown in Fig. 3. The motor housing 26 has posts 78—78 formed thereon, and a metal plate 79 is mounted thereon by screws 80—80.

An inner bearing member 81, generally in the form of a thick disc, lies upon the plate 79, and has at its inner side a centering boss 82, projecting into a bore 83 in the plate 79, and is secured to the plate by a plurality of screws 84 one of which is shown. At its outer side, it has a cylindrical bearing trunnion 85 projecting into a trunnion bearing bore 86 in the lower end of the hanger 24, and surrounded by a planar annular face 87 fittingly engaging the inner side of the hanger 24.

A horizontal locking pin 88 is threaded into the bearing member 81 coaxial therewith, and extends outwardly therefrom; and telescoped over it is an outer bearing member 89 having a central bore 90 to receive the pin.

The bearing member 89 has a cylindrical bearing trunnion 91 projecting into the hanger bore 86 from its outer side, and surrounded by an annular face 92 fittingly engaging the outer side of the hanger 24.

The axially outer part of the bearing member 89 is turned down as at 93 to receive telescoped thereover, the aforesaid handle 31 secured thereto by a set screw 94.

The said locking pin 88 has a shoulder 95 engaging the outer end of the bearing member 89, and outwardly beyond the shoulder has a tapered head 96 upon which is rigidly mounted by means of a washer 97 and screw 98 the said locking handle 30 for turning the locking pin 88.

The two bearing members 81 and 89 are prevented from rotating, one relative to the other, by a dowel pin 100 disposed in bores 101—102 in the respective bearing members.

The handle 30 upon being rotated in one direction, screws the locking pin 88 farther into the bearing member 81. The head 96 on the pin reacts on the bearing member 89 and the two bearing members are drawn toward each other, rigidly clamping the hanger 24 between the faces 87 and 92 on the respective bearing members, and preventing rotation of the trunnion bearings 85 and 91 from turning in the hanger bore 86. The motor housing 26 being secured to the bearing member 81 is thus locked against rotation on the hanger.

Upon turning the handle 30 in the other direction the clamping pressure is relieved; and the motor housing may be adjustably rotated to another position, the two bearing trunnions 91 and 85 turning in unison in the hanger bore 86. This rotation of the motor to adjustably position it may be done by means of the propelling handle 31. The motor may then be locked in the new position by the handle 30.

To indicate the angular rotated positions of the motor, a scale 103 (see Figs. 1 and 5) is mounted on the outer surface of the hanger 24 and a pointer 104 cooperating therewith is mounted on the bearing member 89.

The construction of the other trunnion bearing 29 indicated in Fig. 1 may be like the corresponding bearing of the aforesaid application.

I claim:

1. In a machine tool of the type comprising a main base, a work table on the base, an arm supported by the base and overhanging the worktable, and a horizontal trackway supported on the arm for rotation in horizontal planes by a pivot bearing construction having a vertical bearing axis at an intermediate portion of the trackway; an improved pivot bearing construction comprising a horizontal plate element secured to an upper portion of the trackway, and having a circular peripheral portion carrying an indicating scale and provided with a vertical central first bore, and having on its upper side an annular planar horizontal first face; horizontal guideways on opposite sides of the arm; a head bridging the guideways and shiftable therealong; the head having on its underside an annular planar horizontal second face confronting the said first face, and having a coaxial vertical second bore therein; a pin having a vertical body telescoped through the first and second bores; a flange on its upper portion supported by an upper portion of the head, and a nut threaded on its lower portion below the plate element; a laterally extending handle on the nut for turning it to clampingly draw the head and plate element together between the flange and nut, to lockingly engage the first and second faces, in different rotated positions of the trackway and plate element; the pin projecting through and beyond a transverse portion of the trackway; a washer surrounding the lower portion of the pivot pin below the said transverse portion; the pin and washer having engagable surfaces preventing rotation of the pin in the washer; the washer provided with an arcuate concentric aperture therethrough; a screw projected through the aperture and threaded into the said transverse portion to clamp the washer thereto, in adjusted rotational positions of the pin and washer relative to the said nut; and a scale pointer for the said scale, mounted on the head adjacent to the scale on the plate element.

2. In a machine tool of the type comprising a main base, a work table on the base, an arm supported by the base and overhanging the worktable, and a horizontal trackway supported on the arm for rotation in horizontal planes by a pivot bearing construction having a vertical bearing axis at an intermediate portion of the trackway; an improved bearing construction comprising a horizontal plate element secured to an upper portion of the trackway, and provided with a vertical central first bore, and having on its upper side an annular planar horizontal first face; horizontal guideways on opposite sides of the arm; a head bridging the guideways and shiftable therealong; the head having on its underside an annular planar horizontal second face confronting the said first face, and having a coaxial vertical second bore therein; a pin having a vertical body telescoped through the first and second bores; a flange on its upper portion supported by an upper portion of the head, and a nut threaded on its lower portion below the plate element; a laterally extending handle on the nut for turning it to clampingly draw the head and plate element together between the flange and nut, to lockingly engage the first and second faces, in different rotated positions of the trackway and plate element; the pin projecting through and beyond a transverse portion of the trackway; a washer surrounding the lower portion of the pivot pin below the said transverse portion; the pin and washer having engagable surfaces preventing rotation of the pin in the washer; the washer provided with an arcuate concentric aperture therethrough; a screw projected through the aperture and threaded into the said transverse portion to clamp the washer thereto, in adjusted rotational positions of the pin and washer relative to the said nut.

3. In a machine tool of the type comprising a main base, a work table on the base, an arm supported by the base and overhanging the worktable, and a horizontal trackway supported on the arm for rotation in horizontal planes by a pivot bearing construction having a vertical bearing axis at an intermediate portion of the trackway; an improved pivot bearing construction comprising a horizontal plate element secured to an upper portion of the trackway, and provided with a vertical central lower bore, and having on its upper side an annular planar horizontal first face; horizontal guideways on opposite sides of the arm; a head bridging the guideways and shiftable therealong; the head having on its underside an annular planar horizontal second face confronting the said first face, and having a coaxial vertical upper bore therein; a pin having a vertical body telescoped downwardly through the upper and lower bores; a flange on its upper portion transversely larger than the upper bore, and thereby supported on the head, and a nut threaded on its lower portion below the plate element larger transversely than the lower bore; a laterally extending handle on the nut for turning it in alternate directions, to clampingly draw the head and plate element together between the flange and nut, to lockingly engage the first and second faces, when the nut is turned in one direction, and to unlock them when turned in the other direction; the lower end portion of the pin projecting downwardly below the nut; and means, comprising a gripping element secured to the trackway, gripping the pin lower end portion constraining the pin to rotate in unison with the trackway, when the nut has been turned to unlock the said engagement, and the gripping element being adjustable on the trackway to adjustably rotate the pin in the nut.

4. In a machine tool of the type comprising a base, a work table on the base, a horizontal trackway supported above the work table, a carriage reciprocable on the trackway, a motor driven saw suspended between a pair of hangers depending from the carriage, and rockable to different angular positions on a trunnion bearing construction on the hangers having a horizontal trunnion bearing axis; an improved trunnion bearing construction comprising: a bore in one of the hangers; a first bearing element secured to the side of the motor and having a trunnion bearing portion projecting into said hanger bore at the motor side thereof and rotatable in the bore, and an outer portion engaging the motor side of the hanger; a second bearing element having a trunnion bearing portion projecting into said hanger bore at said one opposite side of the hanger, and rotatable in said hanger bore and having an outer portion engaging said opposite side of said one hanger; a shaft extending through the second bearing element and having a shoulder engaging an outer portion thereof, and threaded into the first bearing element, and, upon rotation thereof in one direction, drawing the two bearing elements together and lockingly clamping their outer portions upon opposite sides of said one hanger; and means interconnecting the two bearing elements to constrain their trunnion bearing portions to rotate in unison in the hanger bore, when unlocked by rotation of the shaft in the other direction.

5. In a machine tool having a base, a work table, an arm supported by the base and adapted to overlie the work table, and a trackway supported by said arm and adapted to support a machine tool: means for supporting said trackway on said arm for pivotal movement about an axis normal to the plane of the work table comprising, a head reciprocably mounted on said arm and having a central aperture and an annular cylindrical shoulder; a disc-like element immovably attached to said trackway and having a central aperture and an annular shoulder; and means suspending said element from said head with said shoulders in surrounding relation and extending through said head aperture into the central aperture of said disc-like element, said suspending means together with said head aperture and said shoulders respectively cooperating to form a first pair and a second pair of surrounding cylindrical surfaces one only of said respective pairs of cylindrical surfaces having journalled bearing engagement.

6. The machine tool according to claim 5 wherein said suspending means includes a pin, a portion of the shank of which cooperates with the surface of said central aperture in said head to provide said journalled bearing engagement with said aperture in said head and wherein a clearance is provided between said shoulders.

7. The machine tool according to claim 5 wherein said suspending means includes a pin projecting loosely through said aperture in said head and said shoulders have a close rotating fit for journalled bearing engagement.

8. In a machine tool having a base, a work table, an arm supported by the base and adapted to overlie the work table, and a trackway supported by said arm and adapted to support a machine tool: means for supporting said trackway on said arm for pivotal movement about an axis normal to said table comprising, a head reciprocably mounted on said arm and having inner and outer radially spaced, axially extending surfaces; a disc-like element immovably attached to said trackway and provided with an outer axially extending surface, means associated with said disc-like element providing an axially extending cylindrical surface forming with said inner surface of said head a pair of inner surfaces and retaining said respective inner and outer surfaces in surrounding relation to provide respective sets of surrounding surfaces, one set only of which has mating journalled association for maintaining journalled relationship in all operative assembled angular positions of said head and said disc-like element.

9. The machine according to claim 8 in which said one of said sets of surfaces is the outer set.

10. The machine according to claim 8 in which said one of said sets of surfaces is the inner set.

11. In a machine tool having a base, a work table, an arm supported by the base and adapted to overlie the work table, a trackway supported by said arm and adapted to support a machine tool: means for supporting said trackway on said arm for pivotal movement comprising a head reciprocably mounted on said arm and having a shoulder defining a cylindrical outer surface and having an aperture defining a cylindrical inner surface; a disc-like element immovably attached to the trackway and having a cylindrical surface forming with said outer surface a first pair of surrounding surfaces; and means suspending said disc-like element from the head and having a cylindrical surface forming with said inner surface of said head a second pair of surrounding surfaces, one only of said pairs of surrounding surfaces having journalling engagement and the other of said pairs of surrounding surfaces having a sufficient clearance to assure a non-journalling relationship in all angular positions of said trackway.

J. EVERETTE TOMPKINS.

REFERENCES CITED

The following references are of record in the file of this patent:

UNITED STATES PATENTS

| Number | Name | Date |
|---|---|---|
| 732,758 | Long | July 7, 1903 |
| 1,733,532 | Elliot | Oct. 29, 1929 |
| 1,846,641 | Hedgpeth | Feb. 23, 1932 |
| 1,867,275 | McCarter | July 12, 1932 |
| 2,291,999 | Wilson et al. | Aug. 4, 1942 |
| 2,297,882 | Gardner et al. | Oct. 6, 1942 |
| 2,312,356 | Ocenasek | Mar. 2, 1943 |
| 2,356,610 | Penney | Aug. 22, 1944 |

FOREIGN PATENTS

| Number | Country | Date |
|---|---|---|
| 556,116 | France | Apr. 7, 1923 |